(12) United States Patent
Hain et al.

(10) Patent No.: US 8,973,247 B2
(45) Date of Patent: Mar. 10, 2015

(54) METHOD AND DEVICE FOR SUPPLY OF CONNECTING ELEMENTS TO A PROCESSING APPARATUS

(75) Inventors: Jochen Hain, Wissenbach (DE); Stefan Lippert, Hungen (DE); Alexander Pohl, Pohlheim (DE); Joachim Möser, Alsfeld (DE); Thomas Ziegert, Hüttenberg (DE)

(73) Assignee: Newfrey LLC, Newark, DE (US)

( * ) Notice: Subject to any disclaimer, the term of this patent is extended or adjusted under 35 U.S.C. 154(b) by 389 days.

(21) Appl. No.: 13/196,190

(22) Filed: Aug. 2, 2011

(65) Prior Publication Data

US 2011/0289763 A1 Dec. 1, 2011

Related U.S. Application Data

(62) Division of application No. 11/510,856, filed on Aug. 25, 2006, now Pat. No. 8,015,686.

(30) Foreign Application Priority Data

Aug. 31, 2005 (DE) .......................... 10 2005 041 534

(51) Int. Cl.
*B21J 15/02* (2006.01)
*B23P 11/00* (2006.01)
(Continued)

(52) U.S. Cl.
CPC ............... *B23P 19/001* (2013.01); *B21J 15/32* (2013.01); *B23P 19/003* (2013.01)
USPC ........ 29/525.06; 29/798; 29/34 B; 29/243.53; 29/432.2; 227/139

(58) Field of Classification Search
USPC ............. 29/432.2, 524.1, 525.06, 432, 432.1, 29/525.05, 34 B, 798, 243.53; 227/139
See application file for complete search history.

(56) References Cited

U.S. PATENT DOCUMENTS

| 1,859,081 A | 5/1932 | Elsner |
| 2,216,403 A | 10/1940 | Oeckl et al. |

(Continued)

FOREIGN PATENT DOCUMENTS

| CA | 1255880 | 6/1989 |
| CH | 563841 | 7/1975 |

(Continued)

OTHER PUBLICATIONS

Opposition filed by third party (Bollhoff), 251 pages.

*Primary Examiner* — Essama Omgba
(74) *Attorney, Agent, or Firm* — Harness, Dickey & Pierce, P.L.C.

(57) ABSTRACT

In a method of supplying connecting elements to a processing unit, in which the connecting elements are placed in readiness by a supply unit and conveyed individually by a passage to a loading device arranged on the processing unit, the conveyance of the connecting elements takes place in two separate steps, a first step in which the connecting elements are individually conveyed by the supply unit into a intermediate reservoir arranged near the loading device, and a second step in which a single connecting element at a time is conveyed from the intermediate reservoir into the loading device of the processing unit. Specifically, at least two different connecting elements are picked up by the intermediate reservoir, and of the several connecting elements accommodated in the intermediate reservoir an arbitrary one determined by the processing operation is selected for the second step and conveyed to the loading device.

22 Claims, 3 Drawing Sheets

(51) Int. Cl.
   *B23P 19/00*   (2006.01)
   *B21J 15/32*   (2006.01)

(56) References Cited

U.S. PATENT DOCUMENTS

| | | | |
|---|---|---|---|
| 2,330,052 A | 9/1943 | Henry et al. | |
| 2,493,868 A | 1/1950 | Griffin | |
| 2,544,165 A | 3/1951 | Krasnow | |
| 2,662,626 A | 12/1953 | Graham et al. | |
| 2,706,504 A | 4/1955 | Moore | |
| 2,755,538 A | 7/1956 | Kirsch | |
| 3,279,045 A | 10/1966 | Dixon | |
| 3,289,884 A | 12/1966 | Klancnik | |
| 3,339,799 A | 9/1967 | Spisak | |
| 3,561,641 A | 2/1971 | Kerr | |
| 3,623,208 A | 11/1971 | Hofmann | |
| 3,750,257 A | 8/1973 | Berecz | |
| 3,789,490 A | 2/1974 | Kohart | |
| 4,005,519 A | 2/1977 | Di Maio et al. | |
| 4,047,281 A | 9/1977 | Di Maio et al. | |
| 4,075,748 A | 2/1978 | Buttriss | |
| 4,220,275 A | 9/1980 | Hametner et al. | |
| 4,345,677 A | 8/1982 | Shinjo | |
| 4,383,359 A | 5/1983 | Suzuki et al. | |
| 4,463,888 A | 8/1984 | Geist et al. | |
| 4,527,326 A | 7/1985 | Kohno et al. | |
| 4,594,764 A | 6/1986 | Yamamoto | |
| 4,604,889 A | 8/1986 | Sukharevsky | |
| 4,616,411 A | 10/1986 | Suzuki et al. | |
| 4,620,656 A | 11/1986 | McClay et al. | |
| 4,625,903 A | 12/1986 | Becht | |
| 4,630,460 A | 12/1986 | Mauer | |
| 4,633,560 A | 1/1987 | Muller | |
| 4,643,344 A | 2/1987 | Kaita et al. | |
| 4,692,983 A | 9/1987 | Kristola et al. | |
| 4,715,114 A | 12/1987 | Yajima | |
| 4,729,163 A | 3/1988 | Muller et al. | |
| 4,765,057 A | 8/1988 | Muller | |
| 4,773,156 A | 9/1988 | Kurita | |
| 4,782,588 A | 11/1988 | Jangaard | |
| 4,801,043 A | 1/1989 | Cindric | |
| 4,815,343 A | 3/1989 | Sofinowski | |
| 4,819,856 A | 4/1989 | Davern et al. | |
| 4,852,376 A | 8/1989 | Suhov | |
| 4,885,836 A | 12/1989 | Bonomi et al. | |
| 4,901,431 A | 2/1990 | Gast | |
| 4,960,360 A | 10/1990 | Giannuzzi et al. | |
| 5,192,012 A | 3/1993 | Schafer et al. | |
| 5,193,729 A | 3/1993 | Dewey et al. | |
| 5,201,892 A | 4/1993 | Salter | |
| 5,206,984 A | 5/1993 | Matumoto et al. | |
| 5,216,819 A | 6/1993 | Givler | |
| 5,231,747 A | 8/1993 | Clark et al. | |
| 5,236,341 A | 8/1993 | Stafford | |
| 5,259,104 A | 11/1993 | Givler | |
| 5,299,351 A | 4/1994 | Takahashi et al. | |
| 5,360,137 A | 11/1994 | Shinjo et al. | |
| 5,375,754 A | 12/1994 | Botha et al. | |
| 5,398,860 A | 3/1995 | Edwards | |
| 5,465,868 A * | 11/1995 | Bonomi | 221/165 |
| 5,472,087 A | 12/1995 | Rink et al. | |
| 5,577,633 A * | 11/1996 | Jones | 221/1 |
| 5,579,975 A | 12/1996 | Moorman | |
| 5,588,554 A * | 12/1996 | Jones | 221/88 |
| 5,640,758 A | 6/1997 | Roessler et al. | |
| RE35,619 E | 10/1997 | Muller | |
| 5,752,305 A | 5/1998 | Cotterill et al. | |
| 5,758,798 A | 6/1998 | Duffy et al. | |
| 5,779,127 A | 7/1998 | Blacket et al. | |
| 5,810,239 A | 9/1998 | Stich | |
| 5,813,114 A | 9/1998 | Blacket et al. | |
| 5,897,045 A | 4/1999 | Olvera et al. | |
| 6,196,414 B1 * | 3/2001 | Ferenczi et al. | 221/123 |
| 6,260,734 B1 | 7/2001 | Auriol et al. | |
| 6,264,063 B1 * | 7/2001 | Turner et al. | 221/278 |
| 6,276,050 B1 | 8/2001 | Mauer et al. | |
| 6,347,449 B1 | 2/2002 | Calkins et al. | |
| 6,388,224 B1 | 5/2002 | Torvinen | |
| 6,398,096 B1 | 6/2002 | Lang | |
| 6,502,008 B2 | 12/2002 | Maurer et al. | |
| 6,511,061 B1 * | 1/2003 | Ferenczi et al. | 271/123 |
| 6,676,000 B2 | 1/2004 | Lang et al. | |
| 6,692,213 B1 | 2/2004 | Butler | |
| 6,796,454 B1 | 9/2004 | Matthews et al. | |
| 6,892,921 B2 | 5/2005 | Beville | |
| 6,944,944 B1 * | 9/2005 | Craythorn et al. | 29/798 |
| 6,968,939 B1 | 11/2005 | Mauer et al. | |
| 6,986,450 B2 * | 1/2006 | Matthews et al. | 227/138 |
| 7,024,270 B2 | 4/2006 | Mauer et al. | |
| 7,131,564 B2 * | 11/2006 | Matthews et al. | 227/138 |
| 7,331,098 B2 * | 2/2008 | Matthews et al. | 29/524.1 |
| 7,487,583 B2 * | 2/2009 | Craythorn et al. | 29/809 |
| 7,748,097 B1 * | 7/2010 | Matthews et al. | 29/407.01 |
| 7,752,739 B2 | 7/2010 | Mauer et al. | |
| 7,849,579 B2 | 12/2010 | Craythorn et al. | |
| 8,015,686 B2 * | 9/2011 | Hain et al. | 29/432.2 |
| 8,046,898 B2 * | 11/2011 | Bloch et al. | 29/525.01 |
| 8,047,416 B2 * | 11/2011 | Davies et al. | 227/120 |
| 2002/0014102 A1 | 2/2002 | Kondo et al. | |
| 2002/0029450 A1 | 3/2002 | Kondo | |
| 2004/0037634 A1 | 2/2004 | Muller et al. | |
| 2004/0107557 A1 | 6/2004 | Morris et al. | |
| 2004/0111878 A1 | 6/2004 | Naito | |
| 2004/0167660 A1 * | 8/2004 | Mauer et al. | 700/175 |
| 2004/0216304 A1 | 11/2004 | Naito | |
| 2004/0217144 A1 * | 11/2004 | Matthews et al. | 227/119 |
| 2005/0284910 A1 * | 12/2005 | Craythorn et al. | 227/112 |
| 2006/0059678 A1 | 3/2006 | Mauer et al. | |
| 2006/0090320 A1 * | 5/2006 | Matthews et al. | 29/407.09 |
| 2006/0097024 A1 * | 5/2006 | Matthews et al. | 227/119 |
| 2006/0151442 A1 | 7/2006 | Schmitt et al. | |
| 2007/0049067 A1 * | 3/2007 | Hain et al. | 439/74 |
| 2007/0289354 A1 * | 12/2007 | Reiter | 72/424 |
| 2009/0212062 A1 * | 8/2009 | Craythorn et al. | 221/1 |
| 2009/0266866 A1 * | 10/2009 | Davies et al. | 227/139 |
| 2011/0049176 A1 * | 3/2011 | Craythorn et al. | 221/1 |
| 2011/0131401 A1 * | 6/2011 | Stoger | 29/243.53 |
| 2011/0252626 A1 * | 10/2011 | Williams | 29/525.01 |
| 2012/0317766 A1 * | 12/2012 | Faitel et al. | 29/243.53 |
| 2012/0317767 A1 * | 12/2012 | Bathurst | 29/243.53 |
| 2012/0324690 A1 * | 12/2012 | Faitel | 29/243.53 |

FOREIGN PATENT DOCUMENTS

| | | |
|---|---|---|
| DE | 744513 | 1/1944 |
| DE | 2 403 904 | 8/1974 |
| DE | 4310953 | 10/1994 |
| DE | 19731344 | 12/1998 |
| DE | 19756798 | 6/1999 |
| DE | 100 64 241 | 7/2002 |
| EP | 0 399 798 | 5/1990 |
| EP | 0 511 093 | 10/1992 |
| EP | 0 715 924 | 6/1996 |
| EP | 1 116 678 | 7/2001 |
| EP | 0 922 538 | 5/2004 |
| FR | 1230342 | 9/1960 |
| FR | 2 662622 | 12/1991 |
| GB | 2 285 405 | 7/1995 |
| JP | 57156174 | 9/1982 |
| JP | 61109644 | 7/1986 |
| JP | 61109646 | 7/1986 |
| JP | 4028926 | 3/1992 |
| JP | 6218637 | 8/1994 |
| JP | 8229752 | 2/1995 |
| JP | 9183022 | 7/1997 |

* cited by examiner

METHOD AND DEVICE FOR SUPPLY OF CONNECTING ELEMENTS TO A PROCESSING APPARATUS

CROSS-REFERENCE TO RELATED APPLICATIONS

This application is a divisional of U.S. patent application Ser. No. 11/510,856, filed on Aug. 25, 2006, now issued as U.S. Pat. No. 8,015,686 on Sep. 13, 2011, which claims the benefit of German Patent Application Serial No. DE 10 2005 041 534.2 filed on Aug. 31, 2005. The above applications are incorporated by reference herein.

BACKGROUND AND SUMMARY

The invention relates to a method of supplying connecting elements to a processing apparatus, in which the connecting elements are placed in readiness by a supplying apparatus and individually conveyed to a loading device arranged on the processing apparatus. The invention relates further to a device for supply of connecting elements to a processing apparatus having a supply device for placing connecting elements in readiness, a loading device arranged on the processing apparatus and a conveyor passage connecting the supply unit to the loading device.

The mechanical automatic processing of connecting elements, for example the setting of rivets, the tightening of screws or the welding on of studs, requires a rapid and reliable supply of the connecting elements to the processing apparatus. Any interference with the supply leads to a retardation of the production process and sometimes to costly maintenance operations, and therefore causes considerable costs. A rapid supply of connecting elements suffers, in many applications, from the circumstance that the processing apparatus, whether stationary or guided by a robot, is in a production cell, while the supply apparatus with individuation and supply container is outside the cell and connected to the processing apparatus by way of a comparatively long supply tube. Such an arrangement is especially unfavorable when the system is designed for simultaneous processing of two different connecting elements. On the supply unit, there is then a switch which guides the connecting element variant required in each instance for the next processing operation into the supply tube. If for reasons of control the call for the next connecting element is transmitted to the supply unit very late, undesirably long cycles result from the long supply tube.

EP 0,922,538 B1 discloses a method in which a connecting element in the form of a self-piercing rivet having a head and a shank offset from the head is supplied by a supply unit through a passage of a loading device arranged at the self-piercing riveter. The passage has a T-shaped cross-section, substantially corresponding to the projected area of the rivet. The rivet is here supplied to the passage with longitudinal axis directed transverse to the direction of travel, and individually transported through the passage to the loading device by means of air. In the direction of loading, the self-piercing rivet supplied is braked and held in an initial position suitable for the operation with the aid of movable positioning segments and a locking element. This known method and the devices disclosed in the document for the purpose have proved successful in practice. In the case of rapid cycles and long transmission routes, however, the duration of direct individual supply of connecting elements by the supply unit proves disadvantageous.

In a method disclosed by EP 0,511,093 B1 for conditioning and delivering small cylindrical parts, such as screws or rivets, the parts are arranged in the same direction, with the shank forward, in a column in a cylindrical supply tube, provided at the top with an opening for feeding with parts and a compressed air entrance and an exit below, associated with a means for intermittent delivery of the parts. The cylindrical tube is annularly arranged in several turns inside a rigid container forming a magazine in which a large number of parts are stored. The inside diameter of the tube is greater in a certain ratio than the greatest diameter of the parts, so that a stream of air by which the parts are driven ahead towards the exit along the tube can flow past the parts to the exit end. This known method has the disadvantage that it requires a comparatively large space near the processing apparatus. Besides, the energy required to transport the parts is relatively large, since in each delivery of a part, the entire column of many parts must be moved. Short-time exchange between parts of different lengths is not readily possible.

A device for supplying rivets to a self-piercing rivet tongs is disclosed by DE 10,064,241 A1. In this known device, the rivets are singly arranged one behind another in a tubular magazine, the magazine being acted upon by compressed air and so dimensioned that a small stream of compressed air can flow past the rivets towards the anterior end of the magazine. At the anterior end of the magazine, there is a means of rivet individuation and delivery consisting of a slide having a rivet-receiving opening slidable to and fro on the tongs transverse to the principal extent of the magazine between a first position for accepting a rivet from the magazine and a second position for delivering the accepted rivet to the tongs. To remove the rivet from the opening of the slide, it is acted upon in the second position of the slide by compressed air, advancing the rivet into a rivet-receiving opening of the tongs and holding it there by negative pressure generated at the anterior end of the ram by way of a bore through it. After transfer of the rivet, to perform a riveting operation the tubular magazine and the means of individuation and delivery pass from a rivet delivery position into a riveting position, in which the head of the rivet tongs is exposed. This known device is costly. A short-time exchange between two rivet versions is not possible.

The object of the invention is to specify a method of the kind initially mentioned that makes possible the feeding of the connecting elements to a processing apparatus in a short time and distinguished by a reliable and trouble-free mode of operation. It is also to be possible to supply at least two different connecting elements within a short time. Another object of the invention is to create a device suitable for operation of the method.

In the method according to the invention, the conveyance of the connecting elements takes place in two steps separate from each other, a first conveyance step in which the connecting elements are individually conveyed from a supply unit into an intermediate reservoir in the neighborhood of the loading means, and a second step in which an individual connecting element is conveyed from the intermediate reservoir into the loading device of the processing unit, at least two like or unlike connecting elements being picked up from the intermediate reservoir, and an arbitrary one of the connecting elements picked up from the intermediate reservoir, being selected and supplied by the process in the second step. By the method according to the invention, the supply time governing the cycle is considerably reduced, so that only the second step has an effect on the length of the cycle, and the period of the second step, owing to the arrangement of the intermediate reservoir on the processing unit near the loading means, is extraordinarily short. Even with delayed supply commands, a short timing can be realized. The first step in the method according to the invention expediently occurs depending on the fill level of the intermediate reservoir, i.e. immediately in each instance when the execution of a second step withdrew a connecting element from the intermediate reservoir. There is then enough time available to refill the emptied storage space, since the first step can be executed simultaneously with a processing step, the disadvantage of a long conveyance passage is therefore no longer a problem, and a late call for the second step is actually of advantage to the available time window.

The method according to the invention has the further advantage that with at least two different connecting elements, the order in which the several connecting elements are supplied to the processing unit may be random, and the connecting element variant to be supplied need not be determined until just before initiation of the second step. Since the intermediate reservoir at any time contains only one connecting element of each variant to be supplied, it may be of comparatively light and compact construction. The interference contour and weight of the processing unit are therefore not especially encumbered by the intermediate reservoir.

The device for supplying connecting elements to a processing unit, according to the invention, comprises an intermediate reservoir preceding the loading device of the processing unit, arranged to accommodate at least two connecting elements supplied through the passage and having at least two storage chambers, each having an entrance opening and an exit opening, the segment of the passage leading to an arbitrary one of the entrance openings and the segment of the passage leading to the loading device being connectable to an arbitrary one of the exit openings. Owing to the conformation according to the invention, each storage chamber of the intermediate reservoir can be supplied with a connecting element via the passage in any sequence, and any one of the stored connecting elements can be taken from a storage chamber and supplied to the operating unit. Preferably the intermediate reservoir is configured to accommodate at least two different connecting elements, for example of different lengths. The connection desired in each instance between the entrance and exit openings and the segments of the passage associated with them can be effected for example by a slide control, in which the passage openings are moved relative to the openings of the storage chambers. Another possibility consists in that switch-controlled branchings or passage segments movable relative to the chamber openings are arranged between the chamber and the passage openings.

In a preferred embodiment of the intermediate reservoir, according to the invention, the storage chambers are arranged side-by-side in a chamber housing, the entrance openings and the exit openings being located on opposed sides of the chamber housing and the chamber housing being movable to and fro between two placements in a housing, a first chamber and a second chamber being connected with the connecting openings provided for the passage in the housing of the intermediate reservoir. This conformation of the intermediate reservoir is simple and inexpensive to produce, and ensures a reliable mode of operation. To move the chamber housing, preferably a double-action pneumatic cylinder is provided.

Another contribution to the simplification of the intermediate reservoir is that the entrance opening and the exit opening of a reservoir chamber are connectable simultaneously to the associated segment of the passage in each instance. So that a connecting element supplied to the intermediate reservoir can here be held back in the intermediate reservoir, the exit opening is closable by means of a controllable barrier, preferably arranged in the housing of the intermediate reservoir. To actuate the barrier, a double-action pneumatic cylinder may be provided. The chamber housing may advantageously be configured as a slide of rectangular shape, lodged movable lengthwise in a prism-shaped opening in the housing of the intermediate reservoir and penetrated by the storage chambers transverse to its direction of motion. It is expedient further if, in the storage chambers behind the entrance openings in the direction of conveyance, latches are arranged that permit a motion of the connecting elements in forward direction and block it in the opposed direction.

To convey the connecting elements located in the intermediate reservoir to the loading device, a nozzle opening into the passage may be provided for the supply of blown air in the housing of the intermediate reservoir, and be so arranged that the jet of blown air leaving the nozzle is directed into the entrance opening of the storage chamber connected to the passage at the time. This conformation has the advantage that no blown air openings are required on the movable chamber housing. Besides, with the help of this blown air supply, the motion of supplied connecting elements passing the latch can be supported, and any connecting elements can be prevented from getting stuck in the vicinity of the latch.

So that the presence of connecting elements in the storage chambers can be monitored, sensors are arranged on the storage chambers whose signals serve to control the supply of connecting elements and the individual steps. As an alternative, sensors may be arranged in the connection openings, which produce a signal when a connecting element passes through. Other sensors detecting when a connecting element leaves the supply unit are preferably provided on the latter. These sensors make possible a simple and reliable control of the supply process and an early recognition of trouble. As sensors, electromechanical, electromagnetic and optical sensors are available.

BRIEF DESCRIPTION OF THE DRAWINGS

The invention will now be illustrated in more detail in terms of an embodiment represented in the drawing by way of example. In the drawing.

DETAILED DESCRIPTION

Figure 1:
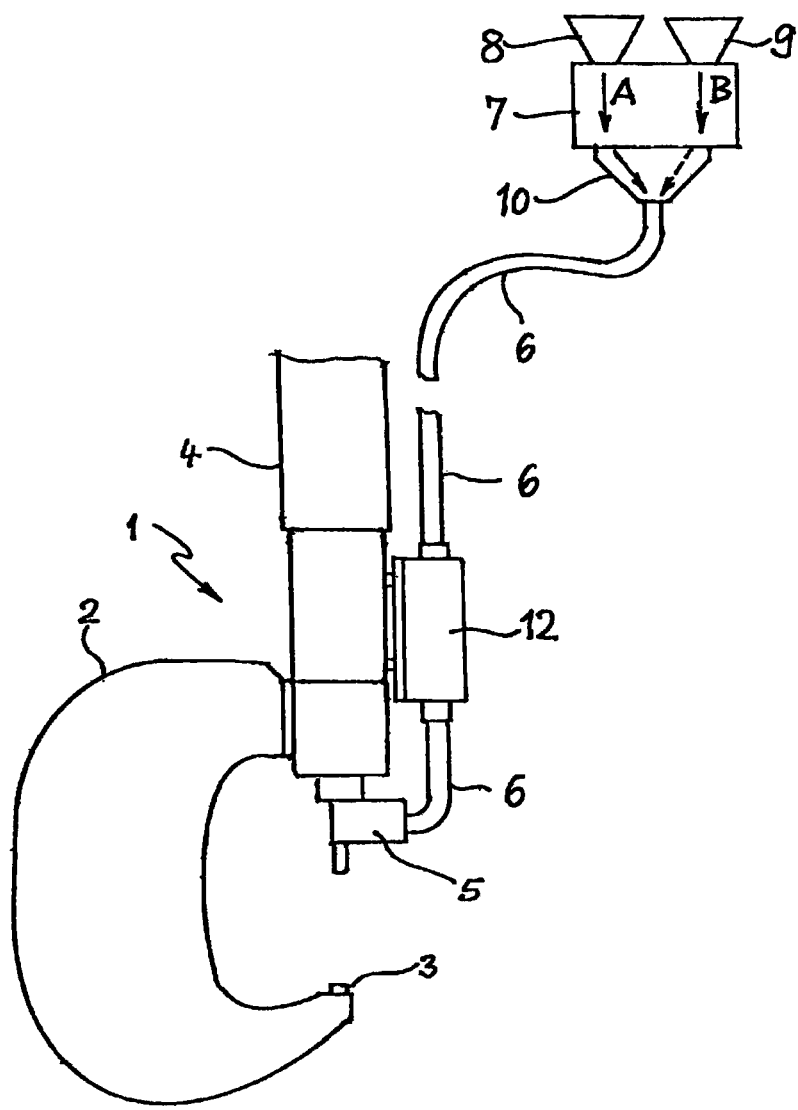
FIG. 1 shows a riveting apparatus having a device for supplying self-piercing rivets.

FIG. 1 shows a processing apparatus 1 intended for processing self-piercing rivets. Self-piercing rivets serve to connect sheet metal parts. They are pressed by a ram with great force from one side into the stacked metal sheets, the sheets being supported on a die forming an abutment. For this purpose, the processing apparatus 1 comprises a C-shaped bow 2, bearing a die 3 at one end and a housing 4 at the opposed end, in which a ram movable against the die 3 and a device for driving the ram are arranged. To supply self-piercing rivets, there is a loading device 5 on the processing apparatus 1, to which self-piercing rivets placed in readiness by a supply unit 7 are supplied by way of a passage 6. The passage 6 consists in part of a yielding tube of synthetic material, in some applications bridging a distance of several meters between the supply unit 7 and the processing unit 1.

The supply unit 7 comprises two supply containers 8, 9, serving to store two different self-piercing rivets A, B, differing from each other in length for example. A controllable switch 10 on the supply unit 7 makes sure that in each instance the conveyed self-piercing rivet A or B, as the case may be, is supplied to the passage 6. Alternatively, two separate supply units may be provided, whose exits are connected to the controlled switch 10.

Figure 2:
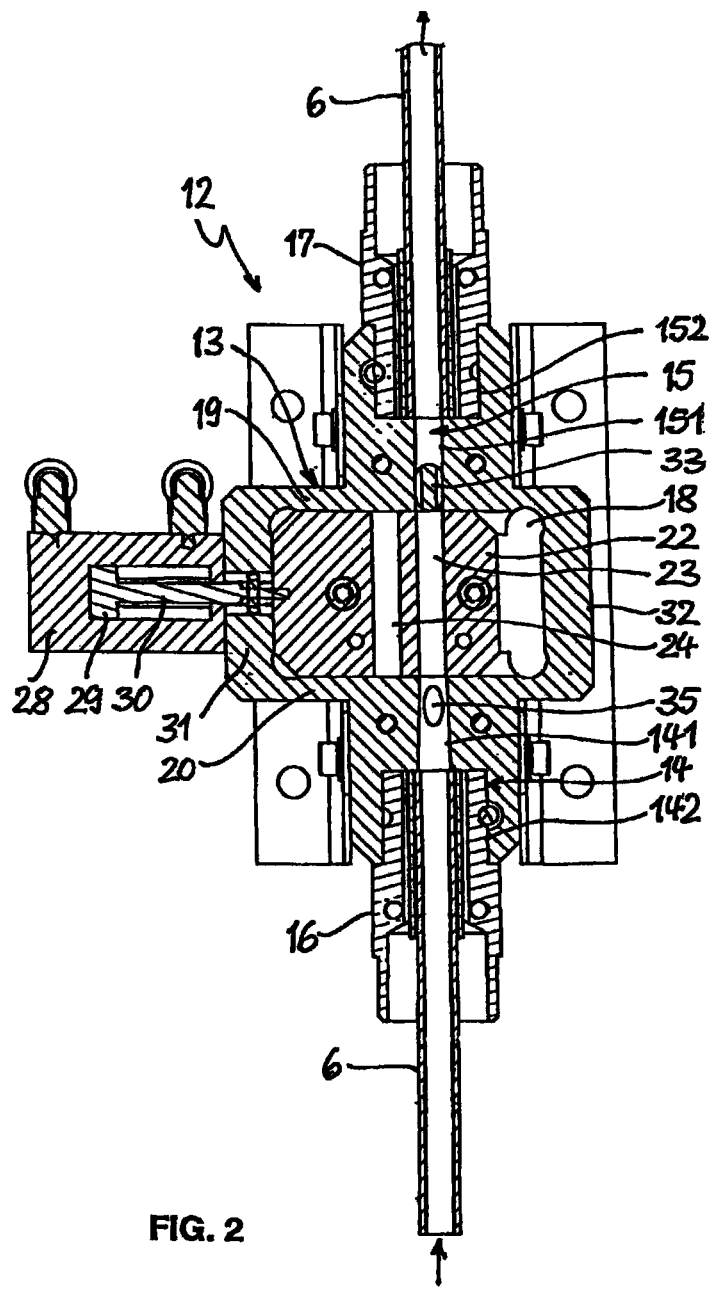
FIG. 2 shows a cross-section of an interim storage.
Figure 3:
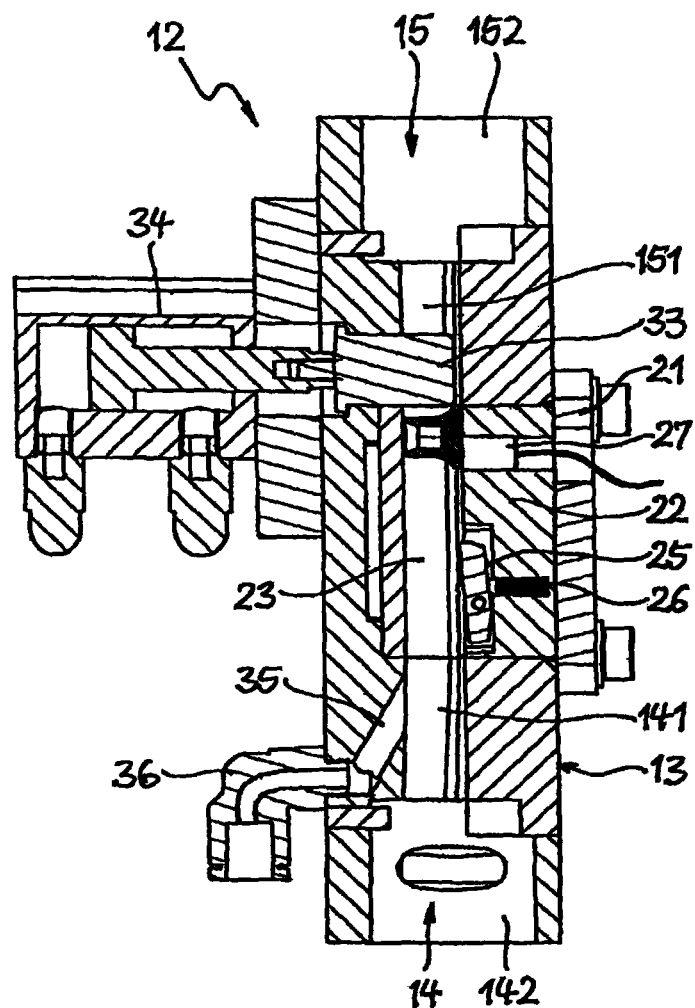
FIG. 3 shows a cross-section of the interim storage in a plane perpendicular to the cross-section of FIG. 2.

In the vicinity of the loading device 5, there is an interim reservoir 12 in the passage 6, fastened to the housing 4 of the processing unit 1. As may be seen in FIGS. 2 and 3, the interim reservoir 12 comprises a storage housing 13 having connection openings 14, 15 on opposed sides for the segments of the passage 6. The connection openings 14, 15 have a common longitudinal axis and consist of passage segments 141, 151 and fastening segments 142, 152, comprising fastening sleeves 16, 17. With fastening sleeve 16, the tube of passage 6 is fastened to the storage housing 13. The fastening sleeve 17 fastens the segment of passage 6 leading to the loading device 5, provided with a means of length equalization, for example a telescoping tube, if the loading device 5 is movable relative to the interim reservoir 12.

The storage housing 13 has a central prism-shaped recess 18 with mutually opposed walls 19, 20, into which the connection openings 14, 15 open. The recess 18 is closed on top by a lid 21. In the recess 18, a prism-shaped chamber housing 22 is arranged, movable to and fro in lengthwise direction of the walls 19, 20 between two positions. The chamber housing 22 contains two storage chambers 23, 24 arranged side-by-side, having the cross-sectional profile of the passage 6 and completely penetrating the chamber housing 22. The storage chambers 23, 24 are so arranged that in the one position of the chamber housing 22 shown in FIG. 2, the storage chamber 23 is aligned with the passage segments 141, 151 of the junction openings 14, 15, and the storage chamber 24 in the other position. The openings of the storage chambers 23, 24 facing the wall 19 form entrance openings, and the openings of the storage chambers 23, 24 facing the wall 20 form exit openings. On the top of the storage chambers 23, 24, there is a latch 25 projecting at one end into the particular storage chamber 23 or 24 as the case may be, and capable of being forced out of the storage chamber 23 or 24 against the force of a spring 26. The latches 25 are so arranged that they permit a motion of a self-piercing rivet in the direction of the outlet openings and block it in the opposed direction. In the neighborhood of the outlet openings, each storage chamber 23, 24 in a bore contains a sensor 27 whose cable passes out through a slit in the lid 21. With the aid of the sensors 27, the presence of self-piercing rivets in the storage chambers 23, 24 can be detected. The motion of the chamber housing 22 is effected by a double-action pneumatic cylinder 28 fastened to the storage housing 13 whose piston 29 is connected to the chamber housing 22 by a piston rod 30. The two positions of the chamber housing 22 are defined by transverse walls 31, 32 of the reservoir housing 13, against which the chamber housing 22 strikes in each instance.

The intermediate reservoir 12 comprises a shut-off slide 33 actuable by means of a double-action pneumatic cylinder 34. The shut-off slide 33 is arranged in an opening leading laterally into a passage segment 151 and, in the locking position shown in FIG. 3, projects into the passage segment 151. In the open position, the locking slide 33 is completely retracted from the passage segment 151, so that a self-piercing rivet can pass the passage segment 151 without hindrance. In the bottom of the passage segment 141, a nozzle 35 configured in the reservoir housing 13 opens, in communication with a nipple 16 for connection of a blown air line. The nozzle opening 35 is inclined in the direction of conveyance, so that a blown jet of air exiting from it is directed into the entrance opening of the particular connected reservoir chamber 23, 24.

In the following, the mode of operation of the supply device and the intermediate reservoir will be described in more detail. On commencement of operation, first the sensors 27 are used to inquire whether self-piercing rivets are present in the storage chambers 23, 24. If this is not the case, then the storage chambers 23, 24 must first be loaded. For this purpose, the slide 23 is moved into the closing position, and the chamber housing 22 into the desired position for loading a rivet A, in which position for example the storage chamber 23 is in connection with the junction openings 14, 15. As soon as this has been done, the supply unit 7 is prompted to perform a first conveyance step for the self-piercing rivet A. The supply unit 7 individuates a rivet A, guides it through the switch 10 into the passage 6, and drives it with blown air into the connected storage chamber 23, where rivet A, after it has passed the latch 25, is held back at the outlet opening of the storage chamber 23 by the closing slide 33. The presence of the rivet A is detected by the sensor 27 and communicated to a controller. This terminates the operation, and initiates the loading of the storage chamber 24 with a self-piercing rivet B. The chamber housing 22 is moved for this purpose into the second position, in which the storage chamber 24 is in communication with the junction opening 14. Then the first step is repeated as described with a self-piercing rivet B.

After both storage chambers 23, 24 have each been loaded with a self-piercing rivet, and this condition has been reported to the controller by the sensors 27, the controller can initiate a cycle of operations. The process controller then instructs a supply controller as to which self-piercing rivet variant, A or B, is to be supplied. If it is self-piercing rivet B, then no displacement of the chamber housing 22 is required, since the storage chamber 24 containing self-piercing rivet B is in junction position. If a rivet A is to be supplied, then the chamber housing 22 is moved into the other position. Execution of the second step with rivet B merely runs the slide 33 into the open position, and a supply of blown air by the nozzle opening 35 puts the rivet B through the junction opening 15 and the passage 6 connected thereto to the loading device. After a short time interval X, at which the self-piercing rivet B will in any case be located in the loading device, the supply of blown air to the nozzle opening 35 shuts off again, and the slide 33 is run back into the closed position. At the same time, likewise time-controlled, the operation of the processing apparatus is started.

After completion of Step 2, slide 33 and chamber housing 22 hold their position while the self-piercing rivet B, now absent in storage chamber 24, signals to the controller that in a renewed first step, a rivet B is again to be loaded in the storage chamber 24. Thus the first step is to be repeated at once as described above with a new rivet B, so that before completion of the processing step, both storage chambers 23, 24 are filled again. For the next processing step, therefore, in a short time a new rivet A or B can be supplied in a second step. The device described permits a reliable delivery of self-piercing rivets of different lengths into the loading device of a processor, and by dividing the delivery into two independent steps, provides for a short cycle and correspondingly high operating speed of the processor.

The invention claimed is:
1. A method of fastening, the method comprising:
    (a) pneumatically feeding rivets from remotely located supply containers to a reservoir;
    (b) moving the reservoir with a C-bow, the C-bow being coupled to a rivet-setting ram and a die;
    (c) supplying a first type of the rivets to a first chamber within the reservoir via a feed inlet;
    (d) supplying at least a second type of the rivets to at least a second chamber within the reservoir via the feed inlet;
    (e) moving the chambers within the reservoir;

(f) interrupting movement of the rivets and temporarily storing the rivets when in their associated chambers in the reservoir;

(g) feeding the first type of the rivets from the first chamber to a location adjacent the rivet-setting ram via a single outlet tube always being aligned with the feed inlet; and (h) feeding the second type of the rivets from the second chamber to the location adjacent the rivet-setting ram.

2. The method of claim 1, further comprising causing an actuator to move the chambers within a housing of the reservoir.

3. The method of claim 2, further comprising using fluid pressure in the actuator to move the chambers within the reservoir housing, the reservoir housing being affixed to a setting tool housing located adjacent to the rivet-setting ram.

4. The method of claim 1, further comprising:
linearly moving the chambers within the reservoir such that only one of the chambers is aligned with a feed tube connected to the feed inlet, between the supply containers and the reservoir, at a time; and
a storage housing containing the reservoir being smaller than a housing for the ram.

5. The method of claim 1, further comprising biasing a latch within the reservoir to block movement of at least one of the rivets therein.

6. The method of claim 1, further comprising supplying pneumatic pressure through an inlet directly connected to the reservoir, the inlet being offset and separate from a rivet supply tube between the supply containers and the reservoir.

7. The method of claim 1, wherein the rivets are self-piercing rivets and the first type of rivet has a different size than the second type of rivet.

8. The method of claim 1, further comprising sensing the presence of the rivets in the chambers and causing one of the rivets to be fed from one of the supply containers if an associated one of the chambers is sensed to be empty.

9. A method of fastening, the method comprising:
(a) pneumatically moving self-piercing rivets from at least one remotely located supply container to a reservoir along an inlet tube;
(b) supplying a first size of the rivets to a first chamber within the reservoir;
(c) supplying at least a second size of the rivets to at least a second chamber within the reservoir;
(d) causing an actuator to move the chambers within a housing of the reservoir;
(e) linearly sliding the chambers within the housing such that only one of the chambers is aligned with the inlet tube at a time;
(f) supplying pneumatic pressure through an inlet connected to the reservoir, the inlet being offset from the inlet tube; and (g) individually and selectively feeding the rivets from the chambers to a location adjacent a rivet-setting ram via a single outlet tube.

10. The method of claim 9, further comprising always moving the reservoir with a rivet-setting tool including the rivet-setting ram and a die.

11. The method of claim 9, further comprising causing a pneumatic cylinder to move the chambers within the housing.

12. The method of claim 9, further comprising using sensors to detect when the rivets leave the supply container and when the rivets are in the chambers.

13. The method of claim 9, wherein the housing of the reservoir is smaller than a housing of the ram.

14. A method of fastening, the method comprising:
(a) feeding differently sized rivets from multiple supplies along an elongated yieldable tube;
(b) moving a first rivet of the differently sized rivets along an elongated yieldable tube to one of multiple rivet-storing chambers;
(c) using an actuator to move the chambers relative to the tube;
(d) sensing the presence of the first rivet in an associated chamber;
(e) feeding the rivets from the chambers to a nose-piece loading inlet through a single flexible outlet tube, to a position adjacent a rivet-setting ram; and
(f) supplying pneumatic pressure through an inlet connected to a housing within which the chambers are located, the inlet being offset from the tube.

15. The method of claim 14, further comprising setting the one rivet into sheets of metal between the ram and a die coupled together by a C-bow.

16. The method of claim 14, wherein the chambers are linearly movable within a reservoir housing which is affixed to a tool housing.

17. The method of claim 14, further comprising feeding a different second type of the rivets along the tube to a second of the chambers, temporarily storing the second rivet in the second chamber, and subsequently moving the second rivet to the position adjacent the rivet-setting ram.

18. The method of claim 14, further comprising the rivets being self-piercing rivets and a sensor being attached to a housing within which are the chambers.

19. The method of claim 14, further comprising setting one of the rivets into a workpiece after the feeding to the position adjacent the ram.

20. The method of claim 14, further comprising moving the ram and the housing with a C-frame.

21. The method of claim 14, further comprising robotically moving the ram and the housing relative to a workpiece.

22. The method of claim 14, wherein there are only two fastener-holding chambers in the reservoir.

* * * * *